US011667197B2

(12) United States Patent
Wei et al.

(10) Patent No.: US 11,667,197 B2
(45) Date of Patent: Jun. 6, 2023

(54) ANGLE-OF-VIEW TESTING METHOD, DEVICE AND SYSTEM FOR A PROJECTION DISPLAY DEVICE

(71) Applicant: BOE TECHNOLOGY GROUP CO., LTD., Beijing (CN)

(72) Inventors: Wei Wei, Beijing (CN); Xiangxiang Zou, Beijing (CN); Saihua Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 73 days.

(21) Appl. No.: 17/045,678

(22) PCT Filed: Jan. 21, 2019

(86) PCT No.: PCT/CN2019/072527
§ 371 (c)(1),
(2) Date: Oct. 6, 2020

(87) PCT Pub. No.: WO2019/196536
PCT Pub. Date: Oct. 17, 2019

(65) Prior Publication Data
US 2021/0029334 A1 Jan. 28, 2021

(30) Foreign Application Priority Data
Apr. 11, 2018 (CN) .......................... 201810321080.9

(51) Int. Cl.
*B60K 35/00* (2006.01)
*G02B 27/14* (2006.01)
*H04N 9/31* (2006.01)

(52) U.S. Cl.
CPC ........... *B60K 35/00* (2013.01); *H04N 9/3185* (2013.01); *H04N 9/3194* (2013.01);
(Continued)

(58) Field of Classification Search
CPC .................................................. G02B 27/0172
See application file for complete search history.

(56) References Cited

U.S. PATENT DOCUMENTS 5,731,902 A * 3/1998 Williams ........... G02B 27/0101
359/201.1
2004/0066547 A1 4/2004 Parker et al.
(Continued)

FOREIGN PATENT DOCUMENTS

CN 101166288 A 4/2008
CN 103026284 A 4/2013
(Continued)

OTHER PUBLICATIONS

"International Search Report and Written Opinion of the International Searching Authority with English language translation", International Application No. PCT/CN2019/072527, dated Apr. 19, 2019, 13 pp.
(Continued)

*Primary Examiner* — Nan-Ying Yang
(74) *Attorney, Agent, or Firm* — Myers Bigel, P.A.

(57) ABSTRACT

An angle-of-view testing method for a projection display device, including setting a reference viewpoint at a same side as a reflective surface associated with the projection display device, setting a metrical marker plate with a metrical marker at another side opposite to the reflective surface at a first distance from the reference viewpoint, projecting a testing picture onto the reflective surface by the projection display device, where light of the testing picture is reflected by the reflective surface toward the reference viewpoint, such that a projected image as a virtual image of the testing picture is observed at the reference viewpoint as being projected onto the metrical marker plate, determining the coverage of the projected image with respect to the metrical
(Continued)

marker of the metrical marker plate, and determining an angle of view of the projection display device based on the determined coverage.

20 Claims, 9 Drawing Sheets

(52) U.S. Cl.
CPC .. *B60K 2370/1529* (2019.05); *B60K 2370/23* (2019.05); *B60K 2370/31* (2019.05); *B60K 2370/334* (2019.05); *B60K 2370/95* (2019.05)

(56) References Cited

U.S. PATENT DOCUMENTS

| | | | |
|---|---|---|---|
| 2008/0062164 A1* | 3/2008 | Bassi | H04N 9/3185 345/214 |
| 2008/0089611 A1 | 4/2008 | McFadyen et al. | |
| 2013/0076791 A1 | 3/2013 | Moussa et al. | |
| 2013/0141311 A1 | 6/2013 | Ho et al. | |
| 2013/0194110 A1 | 8/2013 | Kim et al. | |
| 2015/0234263 A1 | 8/2015 | Yamagiwa et al. | |
| 2015/0331238 A1 | 11/2015 | Roth et al. | |
| 2015/0331239 A1 | 11/2015 | Ando et al. | |
| 2016/0070102 A1 | 3/2016 | Takamatsu et al. | |
| 2016/0182903 A1* | 6/2016 | Grundhöfer | H04N 17/002 348/187 |
| 2016/0195719 A1 | 7/2016 | Yonetani | |
| 2016/0209647 A1 | 7/2016 | Fürsich | |
| 2017/0153457 A1 | 6/2017 | Kunze | |
| 2017/0371165 A1 | 12/2017 | Lambert | |
| 2018/0013992 A1 | 1/2018 | Hayashi | |

FOREIGN PATENT DOCUMENTS

| | | |
|---|---|---|
| CN | 103502876 A | 1/2014 |
| CN | 104849951 A | 8/2015 |
| CN | 105486287 A | 4/2016 |
| CN | 106596051 A | 4/2017 |
| CN | 206132356 U | 4/2017 |
| CN | 106657979 A | 5/2017 |
| CN | 107449589 A | 12/2017 |
| EP | 3267237 A1 | 1/2018 |
| JP | 2008055940 A | 3/2008 |
| JP | 2011209457 A | 10/2011 |
| JP | 2013242346 A | 12/2013 |
| KR | 20130089139 A | 8/2013 |
| WO | 2017147173 A1 | 8/2017 |

OTHER PUBLICATIONS

"Automation solution that meets SAE head-up display (HUD) vehicle standards", retrieved from: www.dzsc.com. English abstract., Sep. 5, 2017, 1 page.
Chinese Office Action corresponding to CN 201810321080.9; dated Aug. 4, 2021 (19 pages, including English translation).
Guiwei, Zhang , "The Design Research of Head-Up Display Interface Interaction", A Dissertation, 96 pages, including English abstract. South China University of Technology. Guangzhou, China, 2015.
Park, Min Woo , et al., "A projector-based full windshield HUD simulator to evaluate the visualization methods", In 2014 Sixth International Conference on Ubiquitous and Future Networks (ICUFN), 2014, 509-510.
Qin, Zong , et al., "Maximal acceptable ghost images for designing a legible windshield-type vehicle head-up display", IEEE Photonics Journal, 9(6), 2017, 1-12.
Sae Standard , "Surface Vehicle Standard: Standard-Optical System HUD for Automotive", SAE International. J1757-2, 2018, 1-23.

* cited by examiner

ANGLE-OF-VIEW TESTING METHOD, DEVICE AND SYSTEM FOR A PROJECTION DISPLAY DEVICE

CROSS REFERENCE TO RELATED APPLICATIONS

The present application is a 35 U.S.C. 371 national stage application of PCT International Application No. PCT/CN2019/072527, filed on Jan. 21, 2019, which claims the benefit of Chinese Patent Application No. 201810321080.9, filed on Apr. 11, 2018, the entire disclosures of which are incorporated herein by reference.

TECHNICAL FIELD

This disclosure relates to a method, device and system for testing an angle of view of a projection display device.

BACKGROUND

Projection display devices such as head-up displays (HUD) have already been widely used. A HUD is an auxiliary instrument used in a vehicle, which may cause a driver to be able to see information on a meter with no need to bow his head, so as to avoid attention interruption and loss of control over the vehicle status. Because of its convenience and ability to improve safety, the head-up display may be used in various types of mobile carriers, including but not limited to airplanes, vehicles and ships, etc.

SUMMARY

According to an aspect of the invention, there is provided an angle-of-view testing method for a projection display device, including: setting a reference viewpoint at the same side as a reflective surface associated with the projection display device; setting a metrical marker plate with a metrical marker at another side opposite to the reflective surface at a first distance from the reference viewpoint; projecting a testing picture onto the reflective surface by the projection display device, wherein light of the testing picture is reflected by the reflective surface toward the reference viewpoint, such that a projected image as a virtual image of the testing picture is observed at the reference viewpoint as being projected onto the metrical marker plate; determining the coverage of the projected image with respect to the metrical marker of the metrical marker plate; and determining an angle of view of the projection display device based on the determined coverage.

In some embodiments, the angle-of-view testing method further includes: setting an image acquisition device at the reference viewpoint. The determining the coverage of the projected image includes: utilizing the image acquisition device to acquire a superposed image of the projected image and the metrical marker plate in response to that the projected image is observed at the reference viewpoint as being projected onto the metrical marker plate; and determining the coverage of the projected image with respect to the metrical marker of the metrical marker plate based on the acquired superposed image.

In some embodiments, the determining the coverage of the projected image further includes: adjusting the metrical marker plate, such that the center of the metrical marker plate is aligned with that of the projected image.

In some embodiments, each of the metrical marker plate and the testing picture includes a horizontal centerline and a vertical centerline. The adjusting the metrical marker plate includes: translating the metrical marker plate, such that the horizontal centerline and the vertical centerline of the metrical marker plate coincide with the horizontal centerline and the vertical centerline of the projected image, respectively.

In some embodiments, the metrical marker includes multiple horizontal marking lines and multiple vertical marking lines. The determining the coverage of the projected image includes: determining the coverage of the projected image with respect to the horizontal marking lines and/or the vertical marking lines. The determining an angle of view of the projection display device includes: determining a vertical angle of view based on the coverage of the projected image with respect to the horizontal marking lines, and/or determining a horizontal angle of view based on the coverage of the projected image with respect to the vertical marking lines.

In some embodiments, the multiple horizontal marking lines intersect the multiple vertical marking lines to form multiple grids. The determining the coverage of the projected image includes: determining the number of grids in the multiple grids which are covered by the projected image in the horizontal direction, and/or determining the number of grids in the multiple grids which are covered by the projected image in the vertical direction. The determining an angle of view of the projection display device includes: determining the horizontal angle of view based on the determined number of grids covered by the projected image in the horizontal direction, and/or determining the vertical angle of view based on the determined number of grids covered by the projected image in the vertical direction.

In some embodiments, the multiple horizontal marking lines are symmetrical with respect to the horizontal centerline of the metrical marker plate, and the multiple horizontal marking lines are arranged such that an n-th of the multiple horizontal marking lines starting from the horizontal centerline of the metrical marker plate in the vertical direction has a distance to the horizontal centerline of the metrical marker plate, $a=s*\tan(n*\theta)$, wherein n is natural number, s is the first distance, and $\theta$ is a first unit degree. The multiple vertical marking lines are symmetrical with respect to the vertical centerline of the metrical marker plate, and the multiple vertical marking lines are arranged such that an m-th of the multiple vertical marking lines starting from the vertical centerline of the metrical marker plate in the horizontal direction has a distance to the vertical centerline of the metrical marker plate, $b=s*\tan(m*\eta)$, wherein m is natural number, s is the first distance, and $\eta$ is a second unit degree. The determining an angle of view of the projection display device includes: directly deriving the horizontal angle of view from the determined number of grids covered by the projected image in the horizontal direction, and/or directly deriving the vertical angle of view from the determined number of grids covered by the projected image in the vertical direction.

In some embodiments, the determining the number of grids in the multiple grids which are covered by the projected image in the horizontal direction includes: determining the number as a sum of the following: (a) the number of grids which are completely covered in the horizontal direction; (b) the ratio of the horizontal size of a covered part of a partly covered grid at one of the two ends of the projected image in the horizontal direction to the horizontal size of the grid as a whole; and (c) the ratio of the horizontal size of a covered part of a partly covered grid at the other of the two ends of the projected image in the horizontal direction to the horizontal size of the grid as a whole. The determining the number of grids in the multiple grids which are covered by the projected image in the vertical direction includes: determining the number as a sum of the following: (a) the number of grids which are completely covered in the vertical direction; (b) the ratio of the vertical size of a covered part of a partly covered grid at one of the two ends of the projected image in the vertical direction to the vertical size of the grid as a whole; and (c) the ratio of the vertical size of a covered part of a partly covered grid at the other of the two ends of the projected image in the vertical direction to the vertical size of the grid as a whole.

In some embodiments, the multiple horizontal marking lines form a first scale on the vertical centerline of the metrical marker plate, and the multiple vertical marking lines form a second scale on the horizontal centerline of the metrical marker plate. The determining the coverage of the projected image includes: determining the coverage of the projected image with respect to the first scale, and/or determining the coverage of the projected image with respect to the second scale. The determining an angle of view of the projection display device includes: determining the vertical angle of view based on the coverage of the projected image with respect to the first scale, and/or determining the horizontal angle of view based on the coverage of the projected image with respect to the second scale.

In some embodiments, each of the first scale and the second scale is marked with graduations indicative of angles of view with respect to the reference viewpoint. The determining an angle of view of the projection display device includes: directly reading the vertical angle of view based on the coverage of the projected image with respect to the first scale, and/or directly reading the horizontal angle of view based on the coverage of the projected image with respect to the second scale.

In some embodiments, the metrical marker includes multiple concentric patterns, and each of the concentric patterns is marked with a corresponding area or a corresponding angle of view with respect to the reference viewpoint. The determining the coverage of the projected image includes: determining the coverage of the projected image with respect to the multiple concentric patterns. The determining an angle of view of the projection display device includes: determining at least one of a horizontal angle of view and a vertical angle of view based on the coverage of the projected image with respect to the multiple concentric patterns.

In some embodiments, setting the reference viewpoint includes setting the reference viewpoint in a region in which the projected image is visible as a whole.

In some embodiments, setting the reference viewpoint includes setting the reference viewpoint at the center of the region.

According to another aspect of this disclosure, there is provided an angle-of-view testing device for a projection display device. The projection display device is configured to project a testing picture onto a reflective surface associated with the projection display device, wherein light of the testing picture is reflected by the reflective surface toward a reference viewpoint, such that a projected image as a virtual image of the testing picture can be observed at the reference viewpoint. The angle-of-view testing device includes: a metrical marker plate configured to provide a metrical marker and be opposite to the reference viewpoint with respect to the reflective surface, wherein the metrical marker plate is configured to be a first distance from the reference viewpoint, such that the projected image is observed at the reference viewpoint as being projected onto the metrical marker plate; and an angle-of-view determination unit configured to receive a superposed picture of the projected image and the metrical marker plate acquired at the reference viewpoint, determine the coverage of the projected image with respect to the metrical marker of the metrical marker plate based on the superposed picture, and determine an angle of view of the projection display device based on the determined coverage.

According to still another aspect of this disclosure, there is provided an angle-of-view testing system for a projection display device, including: an angle-of-view testing device as described above; and an image acquisition device configured to acquire the superposed picture at the reference viewpoint.

In some embodiments, the projection display device includes a head-up display.

BRIEF DESCRIPTION OF THE DRAWINGS

In the drawings not necessarily drawn to scale, the same reference signs may describe similar components in different views. In the drawings.

DETAILED DESCRIPTION

Figure 1A:
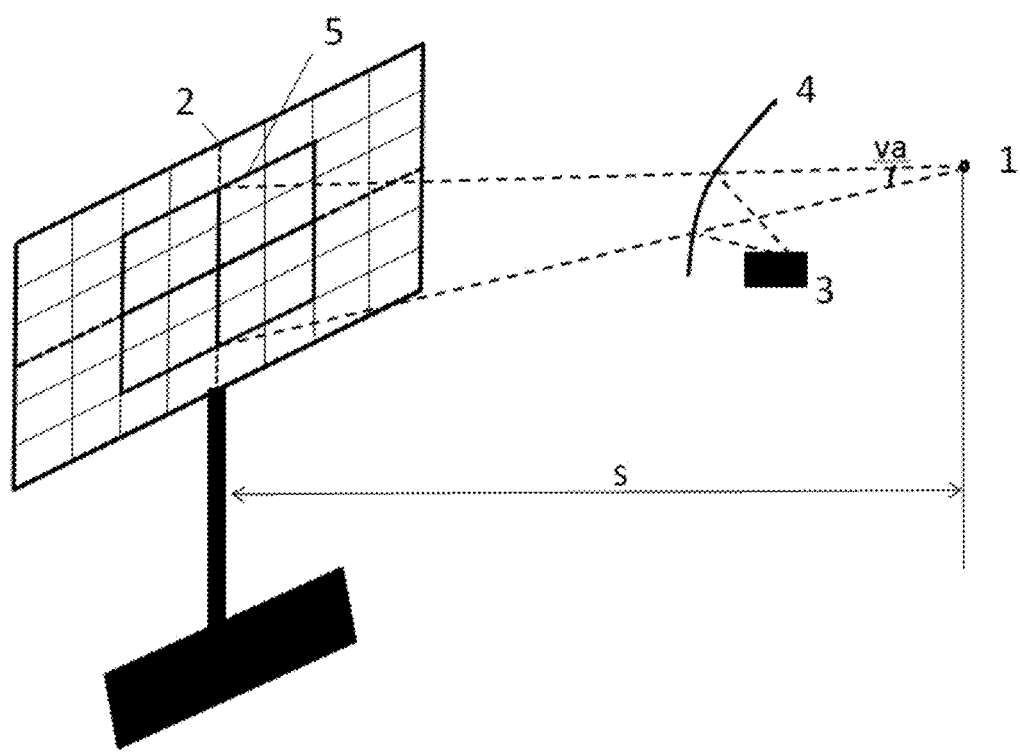
FIG. 1A is a schematic diagram of a system in which an angle-of-view testing method according to an embodiment of this disclosure may be used.

In the following the disclosure will be described in detail in conjunction with the drawings and particular implementations, to let the person having skills in the art better understand the technical solutions of the disclosure.

It will be understood that although the terms first, second, third, etc. may be used to describe various elements, components and/or parts herein, these elements, components and/or parts should not be limited by the terms. The terms are only used to distinguish one element, component or part from another. Therefore, a first element, component or part discussed in the following may be called a second element, component or part without departing from the teachings of the disclosure.

For ease of description, spatially relative terms such as "under", "below", "lower", "beneath", "above", and "upper", etc. may be used to describe a relationship between one element or feature and another (other) element(s) or feature(s) as shown in the drawings in this context. It will be understood that these spatially relative terms are intended to encompass a different orientation of a device in use or operation other than that depicted in a figure. For example, if the device in the figure is flipped, an element described as "below other elements or features" or "under other elements or features" or "beneath other elements or features" will be oriented as "above other elements or features". Therefore, exemplary terms "below" and "beneath" may encompass both of the orientations, above and below. Terms such as "before" or "in front of" and "after" or "followed by", etc. may similarly be used to indicate an order in which light passes elements, for example. A device may be oriented in other ways (rotated by 90 degrees or other orientations) and a spatially relative descriptor used herein is explained accordingly.

The terminology used herein is for the purpose of describing particular embodiments only and is not intended to limit the disclosure. As used herein, the singular forms "a", "an" and "the" are intended to include the plural forms as well, unless the context clearly indicates otherwise. It will be further understood that the terms "includes" and/or "including" when used herein, specify the presence of stated features, integers, steps, operations, elements, and/or components, but do not preclude the presence or addition of one or more other features, integers, steps, operations, elements, components, and/or groups thereof. As used herein, the terms "and/or" include any and all combinations of one or more of related listed items.

It will be understood that when an element is referred to as "being coupled to another element", "being coupled to another element", or "being adjacent to another element", it may be directly coupled to another element, directly coupled to another element, or directly adjacent another element, or there may be an intermediate element. On the contrary, when an element is referred to as "being directly coupled to another element", "being directly coupled to another element", or "being directly adjacent to another element", there does not exist an intermediate element.

Unless otherwise defined, all the terms (including technical terms and scientific terms) used herein have the same meanings as those commonly understood by the person having ordinary skills in the art that the disclosure pertains to. It will be further understood that the terms such as those defined in commonly used dictionaries should be interpreted to have the meanings consistent with those in the context of the specification and/or the related art, and will not be interpreted with idealized or overly formal meanings, unless so defined clearly herein.

The projection display device referred to herein may include a displayer which forms a display image, an optical apparatus which projects the light of the display image to form an intermediate image, and a light guider which guides the light of the intermediate image. For example, the projection display device includes a head-up display (HUD), and the light guider of the HUD guides the light of the intermediate image to a reflective surface associated with the HUD, such that the light reflected by the reflective surface can be visually recognized as a virtual image at a predetermined viewpoint. It is advantageous to implement an intuitive test of an angle of view or a field of view provided by the projection display device during the use of the projection display device.

Figure 1B:
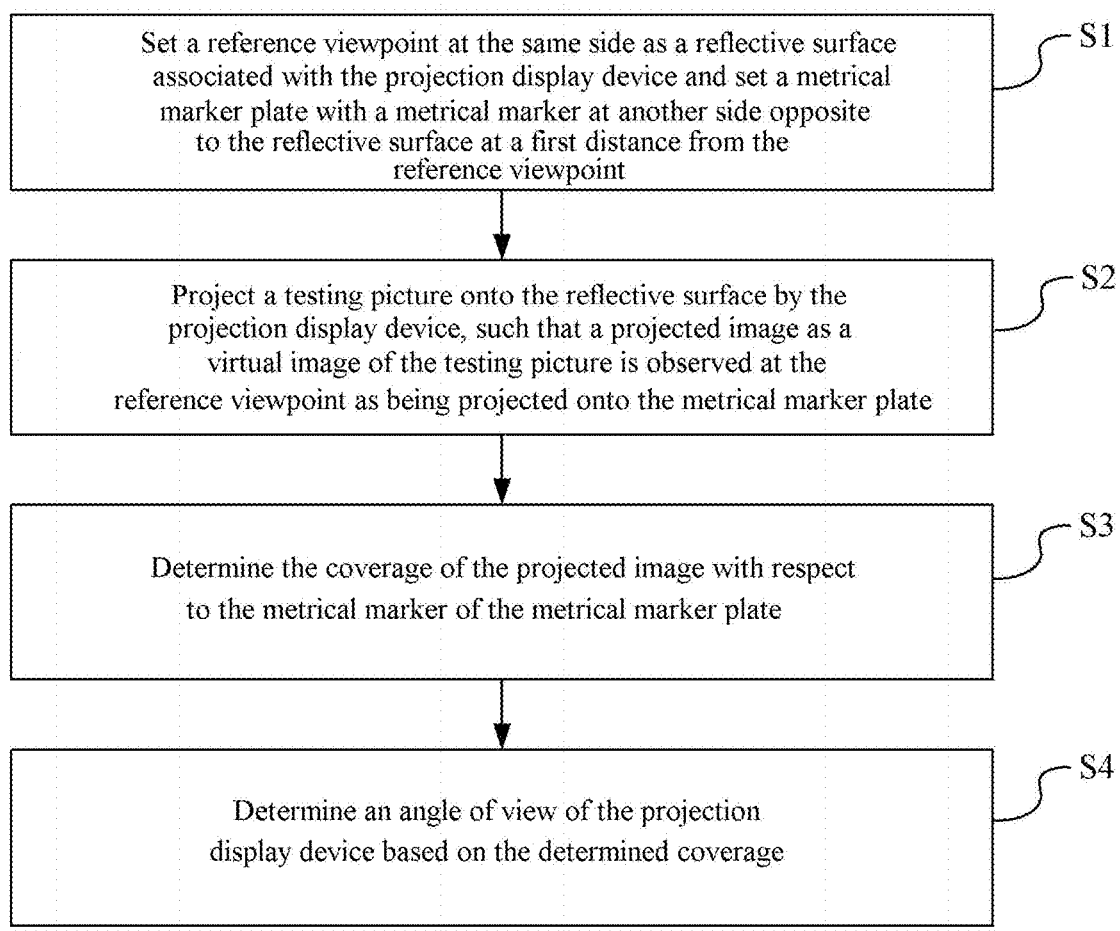
FIG. 1B is a flow chart of an angle-of-view testing method according to an embodiment of this disclosure.

With reference to FIG. 1A and FIG. 1B, an angle-of-view or filed-of-view testing method according to an embodiment of this disclosure will be described in the following.

At step S1, a reference viewpoint 1 and a metrical marker plate 2 are provided.

The reference viewpoint 1 is set at the same side as a reflective surface 4 associated with a projection display device 3. It will be understood that any arrangement of various apparatuses for implementing the same function is effectively "associated" so as to cause a desired function to be implemented. Therefore, any two apparatuses combined herein to implement a specific function may be seen as "being associated" with each other to cause a desired function to be implemented. In this sense, the reflective surface 4 associated with the projection display device 3 refers to a reflective surface which is used together with the projection display device 3 to accomplish the projection function. For example, in a case of the head-up display, the reflective surface 4 may for example be the inside of the front windshield glass of a vehicle, that is, the side of the front windshield glass facing the driver.

The metrical marker plate 2 is set at another side opposite to the reflective surface 4 associated with the projection display device 3. In this context, the term "metrical marker plate" means a device with a metrical marker, to be able to obtain various metrics of a measured object based on the metrical marker, including but not limited to the area of the measured object, sizes of the measured object in various dimensions, and an angle of view with respect to the reference viewpoint 1 corresponding to the sizes or the area. In the example of FIG. 1A, the metrical marker plate 2 is provided with a metrical marker in the form of a grid. In some embodiments, the metrical marker plate 2 takes the form of a plate or curtain on which is provided a real metrical marker. In some embodiments, the metrical marker plate 2 takes the form of a display panel on which an electronically generated metrical marker is displayed. Other embodiments are also possible.

At step S2, the projection display device 3 projects a testing picture onto the reflective surface 4, and light of the testing picture is reflected by the reflective surface 4 toward the reference viewpoint 1, such that a projected image 5 as a virtual image of the testing picture can be observed at the reference viewpoint 1. In an embodiment, the metrical marker plate 2 is located at a first distance s from the reference viewpoint 1, such that the projected image 5 is observed at the reference viewpoint 1 as being projected onto the metrical marker plate 2. Hence, the projected image 5 at least partially covers the metrical marker on the metrical marker plate 2.

At step S3, the coverage of the projected image 5 with respect to the metrical marker of the metrical marker plate 2 is determined. In the example of FIG. 1A, the projected image 5 covers 4 grids in the horizontal direction and also covers 4 grids in the vertical direction.

At step S4, an angle of view va of the projection display device 3 is determined based on the determined coverage.

In this context, the angle of view of the projection display device 3 may be defined as an angle range of the projected image seen at the reference viewpoint 1 and provided by the projection display device 3. The angle of view va may be represented by an angle, the width of a field of view at a predetermined distance (e.g., the first distance s), and so on.

The angle of view va of the projection display device 3 may be calculated in various ways based on the coverage of the projected image 5 on the metrical marker plate 2.

Figure 2A:
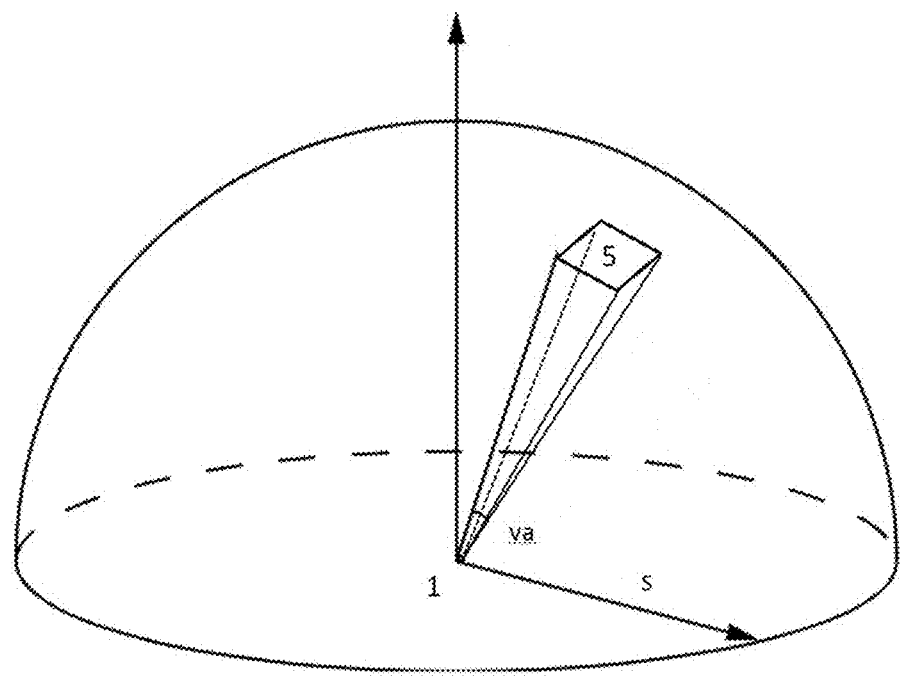
FIG. 2A shows an exemplary illustration of an angle of view of the projection display device.

For example, when the projection display device 3 is applied in an aircraft such as an airplane, it may be necessary to determine its stereoscopic angle of view va. At this point, as shown in FIG. 2A, the stereoscopic angle of view va may be approximately calculated by adopting the following formula (1):

$$va = 4\pi * A_{vi}/4\pi s^2 \quad (1)$$

wherein $A_{vi}$ represents the area of the projection of the projected image 5 on the metrical marker plate 2.

Figure 2B:
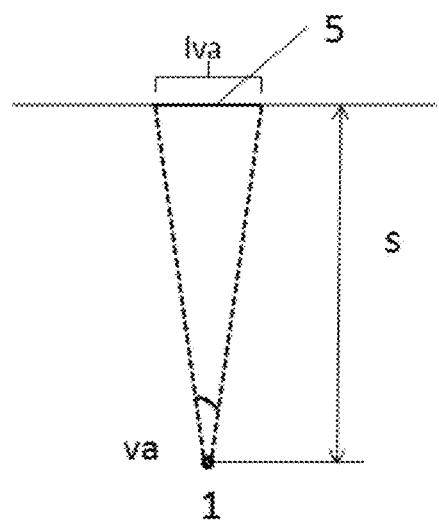
FIG. 2B shows another exemplary illustration of an angle of view of the projection display device.

As another example, when the projection display device 3 is applied in a vehicle (for example, a HUD is installed inside the cab of a ship, a motor vehicle, etc.), it may be necessary to determine its horizontal angle of view in the horizontal direction and its vertical angle of view in the vertical direction. In the following, the horizontal angle of view is taken as an example for explanation. As shown in FIG. 2B, the following formula (2) may be adopted to approximately calculate the horizontal angle of view va:

$$va = 360° * lva/2\pi s \quad (2)$$

wherein lva represents the horizontal size of the projection of the projected image 5 on the metrical marker plate 2. The formula (2) is usually adapted to a situation in which the horizontal angle of view va is small (e.g., less than 30°, less than 20°, and so on).

Figure 2C:
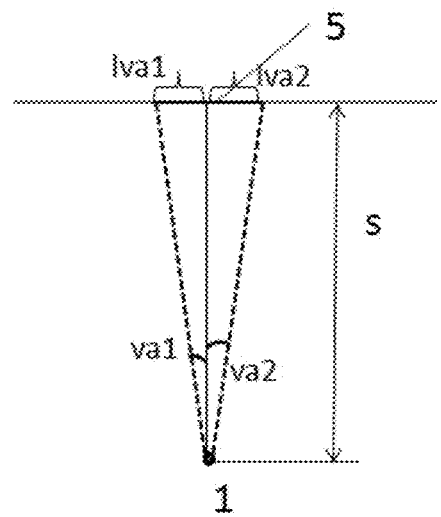
FIG. 2C shows another exemplary illustration of an angle of view of the projection display device.

When the horizontal angle of view va is large, the horizontal angle of view va may be determined more accurately. With reference to FIG. 2C, a vertical plane is made through the reference viewpoint 1 toward the metrical marker plate 2, the vertical plane intersects the metrical marker plate 2 to form an intersection line, and the intersection line divides the horizontal size lva of the projected image 5 on the metrical marker plate 2 into two parts, lva1 and lva2. Then, the following formula (3) may be utilized to calculate the horizontal angle of view va:

$$va = va1 + va2 = \arctan lva1/s + \arctan lva2/s \quad (3)$$

A horizontal angle of view within a larger range may be calculated more accurately utilizing the formula (3). What is described above is also applicable to the vertical angle of view, which will not be repeated here.

The mathematical calculations described above require measuring a physical quantity such as the area, the length, etc., which is not conducive to automation implementation. In the embodiments of this disclosure, by using the metrical marker plate 2, the need for mathematical calculations is at least partially eliminated, and thereby the requirement for calculation resources is lowered.

Figure 3A:
FIG. 3A to FIG. 3C show illustrations of three examples of the metrical marker plate according to embodiments of this disclosure, respectively.
Figure 3B:
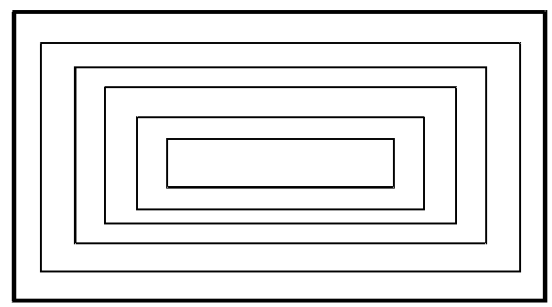
Figure 3C:
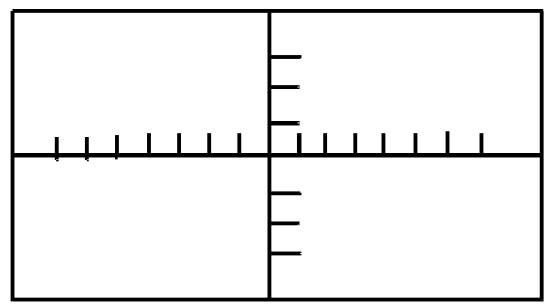

FIG. 3A to FIG. 3C show illustrations of three examples of the metrical marker plate 2, especially its metrical marker, according to embodiments of this disclosure, respectively. In the various embodiments, the metrical marker of the metrical marker plate 2 may include multiple horizontal marking lines and multiple vertical marking lines.

In some embodiments, as shown in FIG. 3A, the metrical marker plate 2 may have a grid as the metrical marker. In particular, the multiple horizontal marking lines intersect the multiple vertical marking lines to form multiple grids. Each of the grids may have a predefined size. By determining the number of grids in the multiple grids which are covered by the projected image 5 in at least one of the horizontal direction and the vertical direction, the area or the horizontal size and/or the vertical size of the projected image 5 may be obtained. Thus, the angle of view of the projection display device 3 may be derived according to one of the formulae (1) to (3) depending on the situation. The number of grids in the multiple grids which are covered by the projected image 5 in the horizontal direction or the vertical direction is not necessarily an integer, because one grid may be partially covered. As will be described below in greater detail, the horizontal marking lines and the vertical marking lines may be arranged such that the number of grids that are covered (both completely and partially) may directly correspond to the angle of view of the projection display device 3.

In some embodiments, as shown in FIG. 3B, the metrical marker plate 2 may have concentric patterns as the metrical marker. In particular, the multiple horizontal marking lines and the multiple vertical marking lines form multiple concentric rectangles. The various patterns may be marked with corresponding areas, for example, A1, 2*A1, ..., n*A1 (n being a natural number). Alternatively or in addition, the various patterns may be directly marked with corresponding angles of view with respect to the reference viewpoint 1, for example, θ, 2*θ, ..., n*θ, wherein n is a natural number, θ is a unit degree, which may be 1° or 2°, for example. Although the concentric patterns in FIG. 3B are shown as concentric rectangles, other forms such as concentric circles may be adopted as needed. Typically, the concentric patterns are chosen as having the same shape as the projection of the projected image 5 on the metrical marker plate 2. As an example, when the projection of the projected image 5 on the metrical marker plate 2 is a rectangle, the concentric patterns also adopt a rectangular shape.

In some embodiments, as shown in FIG. 3C, the multiple horizontal marking lines form a first scale on the vertical centerline of the metrical marker plate 2, and the multiple vertical marking lines form a second scale on the horizontal centerline of the metrical marker plate 2. In other embodiments, graduations in other dimensions may also be adopted. Based on these graduations, the size, area, angle, etc. of the projected image 5 in a corresponding dimension may be obtained. For example, each of the first scale and the second scale is marked with graduations indicative of angles of view with respect to the reference viewpoint 1, such that it may be possible to directly read the vertical angle of view and the horizontal angle of view based on the coverage of the projected image 5 with respect to the first scale and the second scale.

Figure 4:
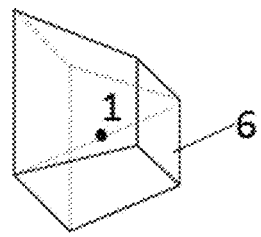
FIG. 4 shows an exemplary illustration of an eye box where the reference viewpoint is located.

As shown in FIG. 4, the reference viewpoint 1 is set within a region 6 (called an "eye box" below), in which the projected image 5 is visible as a whole. In some embodiments, the eye box 6 may be a simple rectangular region, which is equivalent to a theoretical window. In some embodiments, the eye box 6 may be a truncated pyramid in view of body size differences and possible movement of users (drivers in the case of the HUD). For example, when a driver with a smaller body size is seated closer to the front windshield glass or the driver moves closer to the front windshield glass (for example, his eyes are at the front end face of the truncated pyramid-shaped eye box 6), the larger rectangular region corresponding to the front end face is equivalent to its window, whereas when a driver with a larger body size is seated closer to the rear side of the vehicle body or the driver moves closer to the rear side of the vehicle body (for example, his eyes are at the rear end face of the truncated pyramid-shaped eye box 6), the smaller rectangular region corresponding to the rear end face is equivalent to its window. The truncated pyramid shape of the eye box 6 accords with an optical projection relationship, and facilitates that drivers with different body sizes can see the complete projected image 5 at their comfortable seating positions.

In some embodiments, the center of the eye box 6 coincides with the reference viewpoint 1. For example, when the eye box 6 is a simple rectangle, the reference viewpoint 1 may be located at its center. For another example, when the eye box 6 is a truncated pyramid, the reference viewpoint 1 may be located at its center, for example, at its body center, as shown in FIG. 4. These are just exemplary, and other points in the eye box 6 may be taken as the reference viewpoint 1, as long as they can better simulate the average position of the viewpoint.

Figure 7A:
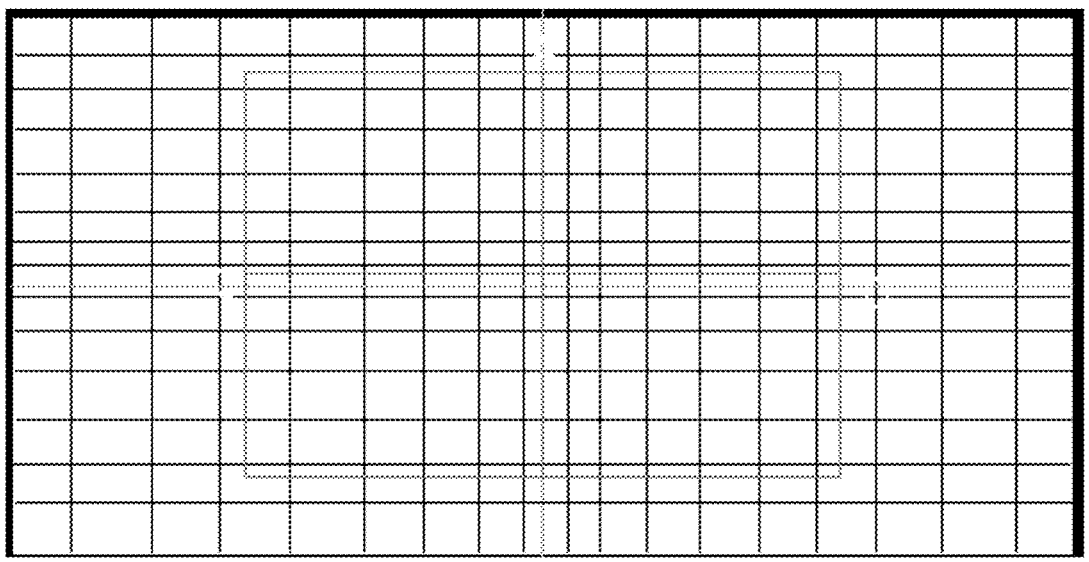
FIG. 7A and FIG. 7B show an illustration in which the centerlines of the metrical marker plate are not aligned with the centerlines of the projected image of the testing picture and an illustration in which the centerlines of the metrical marker plate are aligned with the centerlines of the projected image of the testing picture, respectively.
Figure 7B:
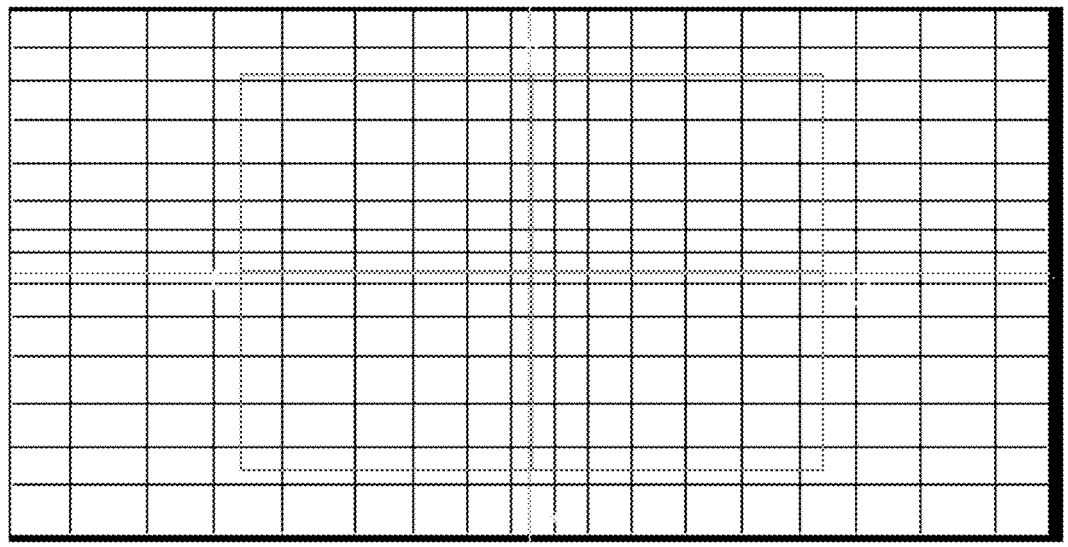

In some embodiments, it may be such that the coverage of the projected image 5 with respect to the metrical marker plate 2 is determined manually by a user, for example by checking the coverage, reading the readings on the metrical marker, and the like. In some embodiments, it may further be possible to set an image acquisition device at the reference viewpoint 1, and the image acquisition device is for example a camera which is based on an image sensor such as a charge coupled device (CCD) or a complementary metal oxide semiconductor device (CMOS), etc. For example, the image acquisition device is utilized to acquire a superposed image (as shown in FIG. 7A and FIG. 7B, for example) of the projected image 5 and the metrical marker plate 2 in response to that the projected image 5 is observed at the reference viewpoint 1 as being projected onto the metrical marker plate 2. Based on the acquired superposed image, the coverage of the projected image 5 with respect to the metrical marker plate 2 may be determined manually or automatically.

In some embodiments, the coverage of the projected image 5 with respect to the metrical marker plate 2 may be determined by utilizing an image processing program. The image processing program may adopt multiple algorithms. For example, it may be possible to adopt a conventional image segmentation algorithm to segment out an image region in the superposed image which is covered by the projection of the projected image 5, then recognize and count the metrical marker in the image region, and thereby derive the coverage. For another example, the image processing program may also adopt a convolutional neural network. By utilizing data of superposed images and the coverage as training data to train the convolutional neural network, and by applying the trained convolutional neural network an actual superposed image acquired by the image acquisition device, the coverage may be obtained.

Figure 5A:
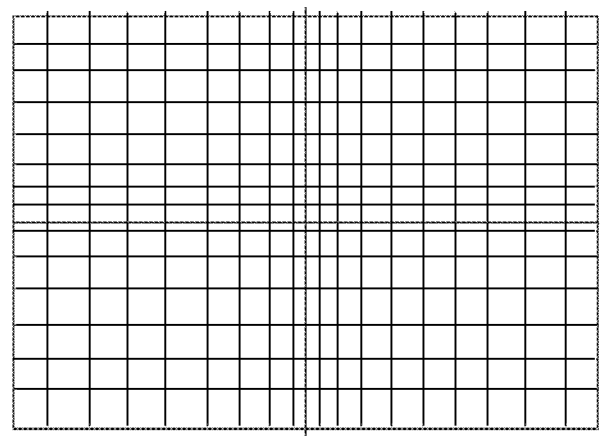
FIG. 5A and FIG. 5B are schematic diagrams of examples of the metrical marker plate according to embodiments of this disclosure.
Figure 5B:
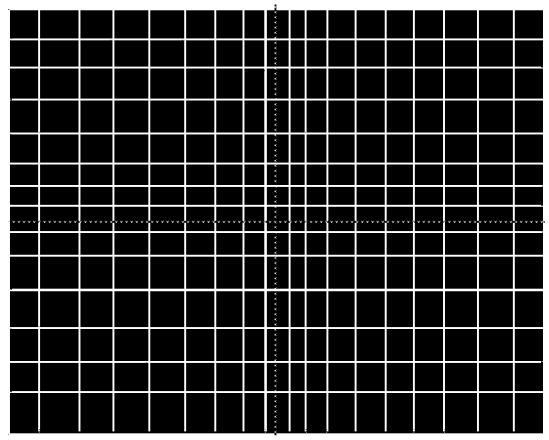

In the following, this technical solution will be introduced in greater detail by a specific embodiment. In this embodiment, the projection display device 3 is an on-board head-up display, and the metrical marker plate 2 is provided with grids formed by horizontal marking lines intersecting vertical marking lines. As shown in FIG. 5A and FIG. 5B, the horizontal marking lines and the vertical marking lines take the form of white lines on a black background or black lines on a white background. Let a vertical marking line located at a center position in the horizontal direction be the vertical centerline of the metrical marker plate 2, and let a horizontal marking line located at a center position in the vertical direction be the horizontal centerline of the metrical marker plate 2. Other horizontal marking lines are symmetrical with respect to the horizontal centerline, and other vertical marking lines are symmetrical with respect to the vertical centerline. As such, each of the grids is a square or a rectangle.

The horizontal size and the vertical size of each of the grids may be adapted to actual needs, which will be introduced in detail hereinafter.

In this specific embodiment, steps similar to or corresponding to the individual steps described above in connection with FIG. 1B adopt the same reference signs as those in FIG. 1B.

At step S1, the metrical marker plate 2, the projection display device 3 and the image acquisition device are arranged according to test requirements, including determining the position of the reference viewpoint 1 in the eye box 6. For example, the position may take the center point of the eye box 6, and the image acquisition device is placed at this position, and meanwhile, the metrical marker plate 2 is arranged at a first distance s from the reference viewpoint 1.

At step S2, the projection display device 3 projects a testing picture onto a reflective surface 4 as the front windshield glass of a vehicle, such that a driver can see the projected image 5 (i.e., a virtual image of the testing picture) on the metrical marker plate 2 through the front windshield glass 4.

At this step, a testing picture prepared in advance may be selected for testing a field of view in which the driver sees the projected image 5. The content of this testing picture is not limited.

Figure 6:
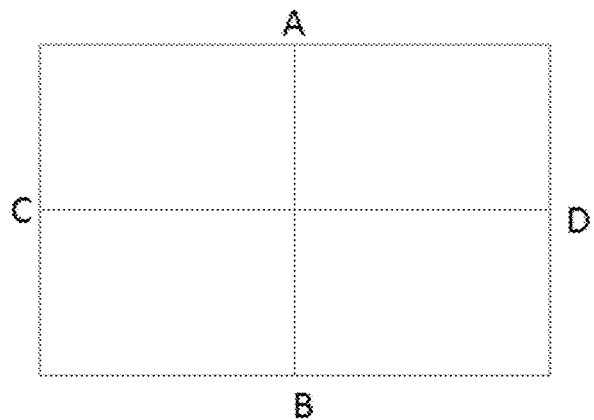
FIG. 6 is a schematic diagram of a testing picture adopted in an angle-of-view testing method according to an embodiment of this disclosure.

In some embodiments, as shown in FIG. 6, the testing picture includes a horizontal centerline CD, a vertical centerline AB and a rectangular frame. The rectangular frame of the testing picture is used for demarcating the maximum angle of view when the driver sees the projected image 5.

For the convenience of recognition and confirmation, the centerlines and the rectangular frame of the testing picture may be highlighted, for example, bolded or indicated in an eye-catching color, or the like. As such, they may be distinguished from other line objects on the metrical marker plate 2, thereby improving the accuracy and convenience of testing.

At step S3, the metrical marker plate 2 is adjusted, such that the center of the metrical marker plate 2 is aligned with the center of the projected image 5, as shown in FIG. 7B. This may be accomplished for example by translating the metrical marker plate 2, such that the horizontal and vertical centerlines of the projected image 5 coincide with the horizontal and vertical centerlines of the metrical marker plate 2, respectively. As compared to a situation in which the metrical marker plate 2 is not aligned with the projected image 5 in FIG. 7A, the convenience and accuracy of testing may be improved. If the misalignment shown in FIG. 7A deteriorates further, the projected image 5 will even exceed the border of the metrical marker plate 2, such that an accurate measurement of the angle of view cannot be accomplished.

At step S4, the number of grids in the individual grids on the metrical marker plate 2 which are covered by the projected image 5 is counted, that is, the coverage of the projected image 5 with respect to the metrical marker of the metrical marker plate 2 is determined. In particular, the image acquisition device is utilized to acquire a superposed image of the projected image 5 and the metrical marker plate 2, and the coverage of the projected image 5 with respect to the metrical marker of the metrical marker plate 2 is determined based on the superposed image.

In this embodiment, the number of grids which are covered in the horizontal direction may directly indicate a horizontal angle of view (without the need for the mathematical calculations of the formulae (1)-(3)), and the number of grids which are covered in the vertical direction may directly indicate a vertical angle of view (without the need for the mathematical calculations of the formulae (1)-(3)). This may be accomplished by establishing correspondence between grids and angles of view. In particular, the multiple horizontal marking lines of the metrical marker plate 2 are arranged such that an n-th of the multiple horizontal marking lines starting from the horizontal centerline of the metrical marker plate 2 in the vertical direction has a distance to the horizontal centerline of the metrical marker plate 2, a=s*tan(n*θ), wherein n is natural number, and θ is a first unit degree. Likewise, the multiple vertical marking lines of the metrical marker plate 2 are arranged such that an m-th of the multiple vertical marking lines starting from the vertical centerline of the metrical marker plate 2 in the horizontal direction has a distance to the vertical centerline of the metrical marker plate 2, b=s*tan(m*η), wherein m is natural number, and η is a second unit degree.

Figure 8:
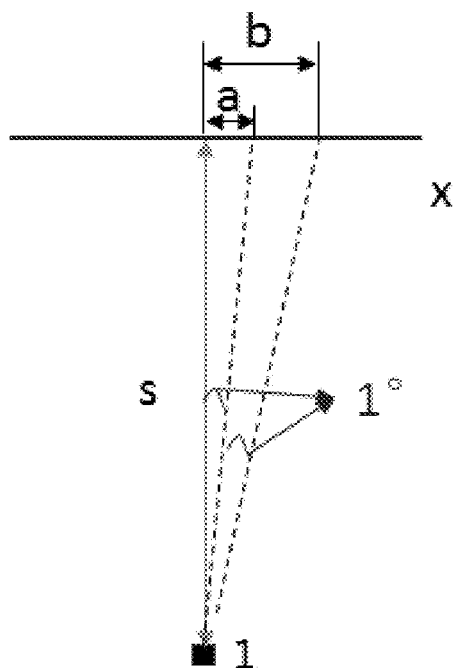
FIG. 8 is a schematic diagram of grid sizes on the metrical marker plate according to an embodiment of this disclosure.

For example, as shown in FIG. 8, there may be multiple vertical marking lines in a direction perpendicular to the horizontal direction x (in this example, perpendicular to the paper plane). When the unit degree θ is chosen as 1°, the distance from a first vertical marking line to the vertical centerline of the metrical marker plate 2 is a=s*tan(1°), the distance from a second vertical marking line to the vertical centerline of the metrical marker plate 2 is b=s*tan(2°), and so on.

As such, correspondence is established between the number of grids which are covered by the projected image 5 and the angle of view of the projection display device 3. The number of grids which are covered by the projected image 5 on the metrical marker plate 2 in the horizontal direction or the vertical direction may be directly converted to a horizontal angle of view or a vertical angle of view without the need for performing the mathematical calculations in the formulae (1)-(3). Such a testing method is simple and intuitive, and has acceptable accuracy. The implementation of the operation of grid counting is also easier by utilizing a computer graphics recognition algorithm.

Figure 9:
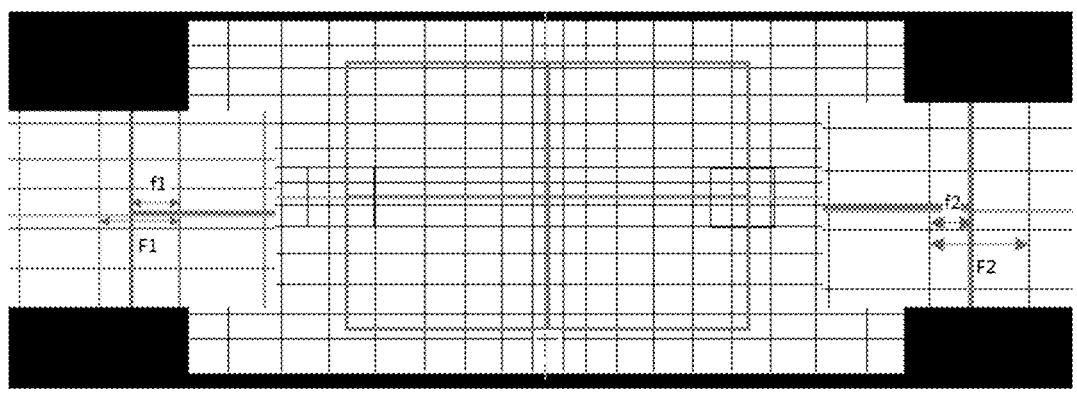
FIG. 9 is a schematic diagram of calculating the number of grids in an angle-of-view testing method according to an embodiment of this disclosure.

As described earlier, the number of grids which are covered by the projected image 5 is not necessarily an integer, because there may be a grid which is not completely covered. FIG. 9 illustrates the coverage of grids on the left and right sides in locally enlarged views of the left and right sides. As shown in FIG. 9, a left grid with a horizontal size of F1 is covered with a horizontal size of f1, and a right grid with a horizontal size of F2 is covered with a horizontal size of f2. If each grid represents an angle of view of 1°, then the horizontal angle of view may be represented as the number of grids completely covered in the horizontal direction+f1/F1+f2/F2. The vertical angle of view may be determined similarly. Although not shown, suppose that an upper grid with a vertical size of F3 is covered with a vertical size of f3, and a lower grid with a vertical size of F4 is covered with a vertical size of f4. In this case, the vertical angle of view may be represented as the number of grids completely covered in the vertical direction+f3/F3+f4/F4.

Figure 10:
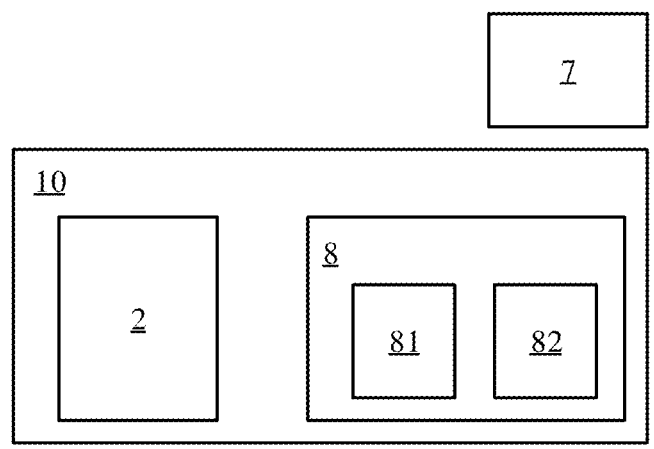
FIG. 10 is a block diagram of an angle-of-view testing system according to an embodiment of this disclosure.

FIG. 10 shows an angle-of-view testing system, which may be used to implementing an angle-of-view testing method as described above. As shown in FIG. 10, the angle-of-view testing system includes an angle-of-view testing device 10 which includes a metrical marker plate 2 and an angle-of-view determination unit 8.

Further, the angle-of-view testing system further includes an image acquisition device 7, which is set at the reference viewpoint 1 in the eye box 6, and configured to acquire a superposed picture of a projected image 5 and the metrical marker plate 2.

As described above, the metrical marker plate 2 is configured to provide a metrical marker and be opposite to the reference viewpoint with respect to the reflective surface 4. The metrical marker plate 2 is located at a first distance from the reference viewpoint, such that the projected image 5 is observed at the reference viewpoint 1 as being projected onto the metrical marker plate 2.

The angle-of-view determination unit 8 is configured to receive a superposed picture of the projected image 5 and the metrical marker plate 2 acquired at the reference viewpoint 1, determine the coverage of the projected image 5 with respect to the metrical marker of the metrical marker plate 2 based on the superposed picture, and determine an angle of view of the projection display device 3 based on the determined coverage. The determination of the coverage and the determination of the angle of view has already been described in detail in the above embodiments about the method, which will not be repeated here any longer.

In some embodiments, the angle-of-view determination unit 8 may be implemented as a computer program. The computer program may for example be stored in an electronic control unit (ECU) of a vehicle, and when executed, cause a processor of the ECU to implement the function of the angle-of-view determination unit 8 described above.

In some embodiments, the angle-of-view determination unit 8 may be implemented as a logic operation circuit, for example, a combinational logic circuit, to carry out one or more step of the angle-of-view testing method, including but not limited to: receiving the superposed picture from the image acquisition device 7, determining the coverage of the projected image 5 with respect to the metrical marker plate 2 based on the superposed picture, and determining the angle of view of the projection display device 3.

In some embodiments, the angle-of-view determination unit 8 includes a processor 81 and a memory 82 on which a computer executable instruction is stored. When executed by the processor 81, the computer executable instruction causes the processor 81 to implement the function of the angle-of-view determination unit 8 described above.

The processor 81 may be implemented in many forms, including one or more general-purpose processing device such as for example an SCM, a central processing unit (CPU), a graphics processing unit (GPU), an acceleration processing unit (APU), etc. More specifically, the processor 81 may be a complex instruction set computing (CISC) microprocessor, a reduced instruction set computing (RISC) microprocessor, a very long instruction word (VLIW) microprocessor, a processor implementing other instruction set, or a processor implementing a combination of instruction sets. The processor 81 may further be one or more dedicated processing device, for example, an application-specific integrated circuit (ASIC), a field programmable gate array (FPGA), a digital signal processor (DSP), a system on chip (SOC), etc.

As will be appreciated by the person having skills in the art, in some embodiments, the processor 81 may be a dedicated processor rather than a general-purpose processor. The processor 81 may include one or more known processing device, for example, a microprocessor from the Pentium™, Core™, Xeon™ or Itanium® series manufactured by Intel™, a microprocessor from the Turion™, Athlon™, Sempron™, Opteron™, FX™, Phenom™ manufactured by AMD™, or any kind of processor manufactured by Sun Microsystems. The processor 81 may further include a graphics processing unit, for example, a graphics processing unit from the GeForce®, Quadre®, Tesla® series manufactured by Nvidia™, a graphics processing unit from the GMA, Iris™ series manufactured by Intel™, or a graphics processing unit from the Radeon™ series manufactured by AMD™.

In addition, although exemplary embodiments have been described herein, their scope includes any and all embodiments based on this disclosure which have equivalent elements, or are modified, omitted, combined (e.g., a scheme in which various embodiments intersect), adapted or changed. An element in the claims will be explained broadly based on the language adopted in the claims, and will not be limited to examples described in this specification or during the implementation of this application, and its examples will be interpreted as non-exclusive. Therefore, this specification and the examples are intended to be regarded as examples only.

The above description is intended to be illustrative rather than restrictive. For example, the above examples (or one or more scheme thereof) may be used in combination with one another. For example, the person having ordinary skills in the art may use other embodiments when reading the above description. In addition, in the above specific implementations, various features may be grouped together to simplify this disclosure. This should not be interpreted as an intention that a disclosed feature which is not claimed is necessary for any claim. On the contrary, the subject matter of this disclosure may be less than all features of a specific disclosed embodiment. Therefore, the following claims are incorporated into DETAILED DESCRIPTION as examples or embodiments, wherein each of the claims acts as a separate embodiment independently, and it is considered that these embodiments may be combined with one another in various combinations or arrangements. The scope of this disclosure should be determined with reference to the full scope of the appended claims and equivalent forms entitled by the claims.

The above embodiments are just exemplary embodiments of this disclosure, not used for limiting this disclosure, and the protection scope of this disclosure is defined by the claims. The person having skills in the art may make various modifications or equivalent substitutions to this disclosure within the essence and protection scope of this disclosure, and the modifications or equivalent substitutions should also be deemed to fall within the protection scope of this disclosure.

What is claimed is:

1. An angle-of-view testing method for a projection display device, comprising:
   setting a reference viewpoint at a same side as a reflective surface associated with the projection display device;
   setting a metrical marker plate with a metrical marker at another side opposite to the reflective surface at a first distance from the reference viewpoint, wherein the metrical marker plate is a device with the metrical marker, to be able to obtain various metrics of a measured object based on the metrical marker, comprising area of the measured object, sizes of the measured object in various dimensions, and an angle of view with respect to the reference viewpoint corresponding to the area or sizes;
   projecting a testing picture onto the reflective surface by the projection display device, wherein light of the testing picture is reflected by the reflective surface toward the reference viewpoint, such that a projected image as a virtual image of the testing picture is observed at the reference viewpoint as being projected onto the metrical marker plate;
   determining a coverage of the projected image with respect to the metrical marker of the metrical marker plate as a number of the metrical marker; and
   determining an angle of view of the projection display device directly from the determined coverage.

2. The angle-of-view testing method as claimed in claim 1, further comprising:
   setting an image acquisition device at the reference viewpoint,
   wherein the determining the coverage of the projected image comprises:
      utilizing the image acquisition device to acquire a superposed image of the projected image and the metrical marker plate in response to the projected image observed at the reference viewpoint being projected onto the metrical marker plate; and
      determining the coverage of the projected image with respect to the metrical marker of the metrical marker plate based on the superposed image that was acquired.

3. The angle-of-view testing method as claimed in claim 2, wherein the determining the coverage of the projected image further comprises:
   adjusting the metrical marker plate, such that the center of the metrical marker plate is aligned with that of the projected image.

4. The angle-of-view testing method as claimed in claim 3, wherein each of the metrical marker plate and the testing picture comprises a horizontal centerline and a vertical centerline, and wherein the adjusting the metrical marker plate comprises:
   translating the metrical marker plate, such that the horizontal centerline and the vertical centerline of the metrical marker plate coincide with the horizontal centerline and the vertical centerline of the projected image, respectively.

5. The angle-of-view testing method as claimed in claim 4,
   wherein the metrical marker comprises multiple horizontal marking lines and multiple vertical marking lines,
   wherein the determining the coverage of the projected image comprises:
      determining the coverage of the projected image with respect to the horizontal marking lines and/or the vertical marking lines, and
   wherein the determining an angle of view of the projection display device comprises:
      determining a vertical angle of view based on the coverage of the projected image with respect to the horizontal marking lines, and/or
      determining a horizontal angle of view based on the coverage of the projected image with respect to the vertical marking lines.

6. The angle-of-view testing method as claimed in claim 5,
   wherein the multiple horizontal marking lines intersect the multiple vertical marking lines to form multiple grids,
   wherein the determining the coverage of the projected image comprises:
      determining a number of grids in the multiple grids which are covered by the projected image in a horizontal direction, and/or determining a number of grids in the multiple grids which are covered by the projected image in a vertical direction, and wherein the determining an angle of view of the projection display device comprises:

determining the horizontal angle of view based on the determined number of grids covered by the projected image in the horizontal direction, and/or determining the vertical angle of view based on the determined number of grids covered by the projected image in the vertical direction.

7. The angle-of-view testing method as claimed in claim 6, wherein the multiple horizontal marking lines are symmetrical with respect to the horizontal centerline of the metrical marker plate, and the multiple horizontal marking lines are arranged such that an n-th of the multiple horizontal marking lines starting from the horizontal centerline of the metrical marker plate in the vertical direction has a distance to the horizontal centerline of the metrical marker plate, $a=s*\tan(n*\theta)$, wherein n is natural number, s is the first distance, and $\theta$ is a first unit degree, wherein the multiple vertical marking lines are symmetrical with respect to the vertical centerline of the metrical marker plate, and the multiple vertical marking lines are arranged such that an m-th of the multiple vertical marking lines starting from the vertical centerline of the metrical marker plate in the horizontal direction has a distance to the vertical centerline of the metrical marker plate, $b=s*\tan(m*\eta)$, wherein m is natural number, s is the first distance, and $\eta$ is a second unit degree, and wherein the determining an angle of view of the projection display device comprises: directly deriving the horizontal angle of view from the determined number of grids covered by the projected image in the horizontal direction, and/or directly deriving the vertical angle of view from the determined number of grids covered by the projected image in the vertical direction.

8. The angle-of-view testing method as claimed in claim 6, wherein the determining the number of grids in the multiple grids which are covered by the projected image in the horizontal direction comprises:
determining the number as a sum of the following: (a) the number of grids which are completely covered in the horizontal direction; (b) a ratio of a horizontal size of a covered part of a partly covered grid at one of two ends of the projected image in the horizontal direction to a horizontal size of the grid as a whole; and (c) a ratio of a horizontal size of a covered part of a partly covered grid at the other of the two ends of the projected image in the horizontal direction to the horizontal size of the grid as a whole, and wherein the determining the number of grids in the multiple grids which are covered by the projected image in the vertical direction comprises:
determining the number as a sum of the following: (a) the number of grids which are completely covered in the vertical direction; (b) a ratio of a vertical size of a covered part of a partly covered grid at one of two ends of the projected image in the vertical direction to a vertical size of the grid as a whole; and (c) a ratio of a vertical size of a covered part of a partly covered grid at the other of the two ends of the projected image in the vertical direction to the vertical size of the grid as a whole.

9. The angle-of-view testing method as claimed in claim 5, wherein the multiple horizontal marking lines form a first scale on the vertical centerline of the metrical marker plate, and the multiple vertical marking lines form a second scale on the horizontal centerline of the metrical marker plate, wherein the determining the coverage of the projected image comprises:
determining the coverage of the projected image with respect to the first scale, and/or
determining the coverage of the projected image with respect to the second scale, and wherein the determining an angle of view of the projection display device comprises:
determining the vertical angle of view based on the coverage of the projected image with respect to the first scale, and/or
determining the horizontal angle of view based on the coverage of the projected image with respect to the second scale.

10. The angle-of-view testing method as claimed in claim 9, wherein each of the first scale and the second scale is marked with graduations indicative of angles of view with respect to the reference viewpoint, and wherein the determining an angle of view of the projection display device comprises:
directly reading the vertical angle of view based on the coverage of the projected image with respect to the first scale, and/or directly reading the horizontal angle of view based on the coverage of the projected image with respect to the second scale.

11. The angle-of-view testing method as claimed in claim 4, wherein the metrical marker comprises multiple concentric patterns, and each of the concentric patterns is marked with a corresponding area or a corresponding angle of view with respect to the reference viewpoint, wherein the determining the coverage of the projected image comprises:
determining the coverage of the projected image with respect to the multiple concentric patterns, and wherein the determining an angle of view of the projection display device comprises:
determining at least one of a horizontal angle of view and a vertical angle of view based on the coverage of the projected image with respect to the multiple concentric patterns.

12. The angle-of-view testing method as claimed in claim 1, wherein setting the reference viewpoint comprises setting the reference viewpoint in a region in which the projected image is visible as a whole.

13. The angle-of-view testing method as claimed in claim 12, wherein setting the reference viewpoint comprises setting the reference viewpoint at the center of the region.

14. An angle-of-view testing device for a projection display device, the projection display device being configured to project a testing picture onto a reflective surface associated with the projection display device, wherein light of the testing picture is reflected by the reflective surface toward a reference viewpoint, such that a projected image as a virtual image of the testing picture is observed at the reference viewpoint, the angle-of-view testing device comprising:
a metrical marker plate configured to provide a metrical marker and be opposite to the reference viewpoint with respect to the reflective surface, wherein the metrical marker plate is configured to be a first distance from the reference viewpoint, such that the projected image is observed at the reference viewpoint as being projected onto the metrical marker plate, wherein the metrical marker plate is a device with the metrical marker, to be able to obtain various metrics of a measured object based on the metrical marker, comprising area of the measured object, sizes of the measured object in various dimensions, and an angle of view with respect to the reference viewpoint corresponding to the area or sizes; and an angle-of-view determination unit configured to receive a superposed picture of the projected image and the metrical marker plate acquired at the reference viewpoint, determine a coverage of the projected image with respect to the metrical marker of the metrical marker plate as a number of the metrical marker based on the superposed picture, and determine an angle of view of the projection display device directly from the determined coverage.

15. An angle-of-view testing system for a projection display device, comprising:
   an angle-of-view testing device as claimed in claim 14; and
   an image acquisition device configured to acquire the superposed picture at the reference viewpoint.

16. The angle-of-view testing system as claimed in claim 15, wherein the projection display device comprises a head-up display.

17. The angle-of-view testing method as claimed in claim 12, further comprising:
   setting an image acquisition device at the reference viewpoint,
   wherein the determining the coverage of the projected image comprises:
      utilizing the image acquisition device to acquire a superposed image of the projected image and the metrical marker plate in response to that the projected image is observed at the reference viewpoint as being projected onto the metrical marker plate; and
      determining the coverage of the projected image with respect to the metrical marker of the metrical marker plate as the number of the metrical marker based on the superposed image that was acquired.

18. The angle-of-view testing method as claimed in claim 17, wherein the determining the coverage of the projected image further comprises:
   adjusting the metrical marker plate, such that the center of the metrical marker plate is aligned with that of the projected image.

19. The angle-of-view testing method as claimed in claim 18, wherein each of the metrical marker plate and the testing picture comprises a horizontal centerline and a vertical centerline, and wherein the adjusting the metrical marker plate comprises:
   translating the metrical marker plate, such that the horizontal centerline and the vertical centerline of the metrical marker plate coincide with the horizontal centerline and the vertical centerline of the projected image, respectively.

20. The angle-of-view testing method as claimed in claim 19,
   wherein the metrical marker comprises multiple horizontal marking lines and multiple vertical marking lines,
   wherein the determining the coverage of the projected image comprises:
      determining the coverage of the projected image with respect to the horizontal marking lines and/or the vertical marking lines, and
   wherein the determining an angle of view of the projection display device comprises:
      determining a vertical angle of view based on the coverage of the projected image with respect to the horizontal marking lines, and/or
      determining a horizontal angle of view based on the coverage of the projected image with respect to the vertical marking lines.

* * * * *